March 17, 1953   D. ROEDER   2,631,514
POWER LIFT MECHANISM FOR TRACTORS
Filed May 6, 1947   3 Sheets-Sheet 1

D. ROEDER
INVENTOR.

BY
E. C. McRae
J. R. Faulkner
T. H. Oster

ATTORNEYS.

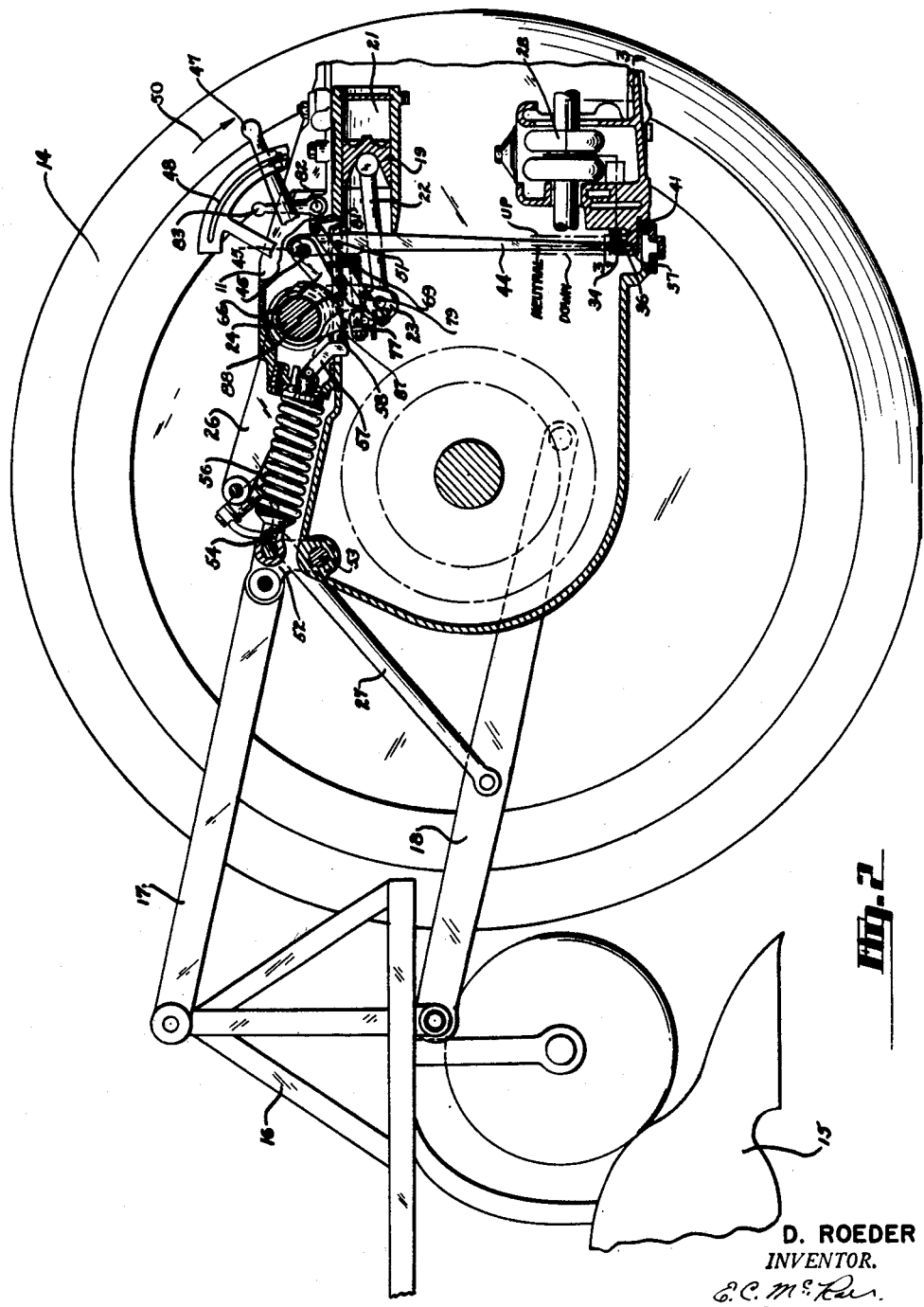

March 17, 1953 D. ROEDER 2,631,514
POWER LIFT MECHANISM FOR TRACTORS
Filed May 6, 1947 3 Sheets-Sheet 3

D. ROEDER
*INVENTOR.*

BY C. C. McRae.
J. R. Faulkner.
T. H. Oster.

ATTORNEYS.

Patented Mar. 17, 1953

2,631,514

UNITED STATES PATENT OFFICE 2,631,514

POWER LIFT MECHANISM FOR TRACTORS

Dale Roeder, Detroit, Mich., assignor to Ford Motor Company, Dearborn, Mich., a corporation of Delaware Application May 6, 1947, Serial No. 746,255

5 Claims. (Cl. 97—50)

This invention relates to tractors and more particularly to improvements in the control of tractors having hydraulic power operated means for raising and lowering implements attached to the tractor.

Reference is made to the patent to Ferguson 2,118,180 which discloses a tractor having hydraulic power operated mechanism for automatically controlling the depth of an implement attached to the tractor in accordance with the draft of the implement. In this general type of tractor the implement, such as a plow, is connected to the tractor by means of upper and lower links, the upper links being in compression and operating against a heavy coil spring to vary the position of an actuating lever connected to a valve. The valve controls the operation of a pump and a ram cylinder which operate through suitable linkage to raise and lower the links to which the implement is attached. A manual control arm connected to the actuating lever controls the depth of cut, and the implement is automatically maintained at this depth by the draft control mechanism.

Reference is also made to the copending application of E. C. McRae, Serial No. 746,331, filed concurrently herewith, which relates to a correlated height and draft control mechanism for a tractor which will enable the implement attachment means to be held at any desired height for normal or light draft conditions, yet in which the draft control mechanism will automatically overrule the height control mechanism in the event the draft increases beyond a predetermined amount or an obstacle is encountered. This is accomplished by providing a pair of adjacent movable fulcrums for the valve actuating lever, one being movable in response to the draft of the implement and the other being movable in response to the height of the implement. The height responsive fulcrum forms the effective fulcrum for the valve actuating lever under most operating conditions while the draft responsive fulcrum is automatically shifted into overriding position and forms the effective fulcrum for the valve actuating lever when the draft increases beyond a predetermined amount.

It is an object of the present invention to improve the structure of the said copending application by providing manually operated means selectively operable to condition the tractor for operation either under draft control alone or under combined height and draft control. This is accomplished by means of a cam connected to a hand lever by suitable linkage and effective upon operation of the hand lever to retract the movable height responsive fulcrum and render it ineffective to control the valve actuating lever. This places the valve actuating lever under the control of the draft responsive fulcrum alone. It is thus possible for the operator to select the mode of operation of the tractor, either under draft control alone or under height and draft control combined.

Still another object is to provide a tractor in which the hydraulic lift mechanism is controlled by means of separate intake and exhaust valves which are controlled by a common linkage in such manner that the intake valve is opened simultaneously as the exhaust valve is closed, and vice versa.

Other objects and advantages of the invention will be made more apparent as this description proceeds, particularly when considered in connection with the accompanying drawings, wherein:

Figure 2 is an enlarged longitudinal sectional view, partly in elevation, of the rearward portion of the tractor, with the implement attachment means in a partially raised position.

Figure 1:
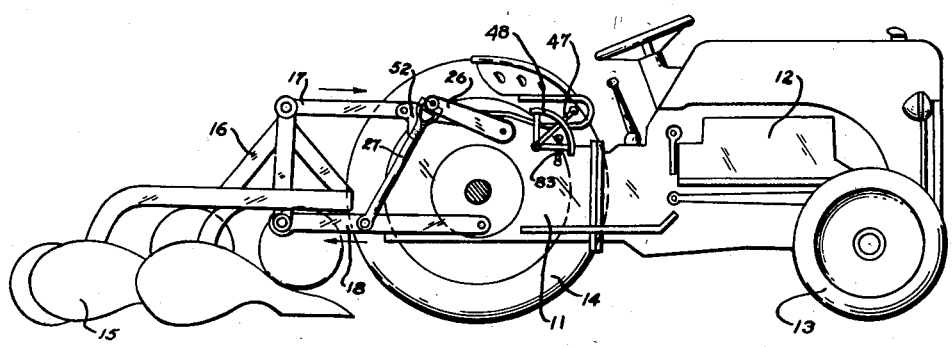
Figure 1 is a side elevational view of a tractor embodying the present invention and having a plow attached thereto.

Referring now more particularly to the drawings, the reference character 11 indicates the rear portion of the tractor casing, 12 the engine thereof, and 13 and 14 the front and rear wheels respectively. The implement shown in Figure 1 is a plow 15, which has an A-frame 16 connected to the tractor by pivotally mounted upper and lower links 17 and 18 respectively. Other implements may, of course, be connected to the links either directly or by means of a conventional drawbar supported between the rearward ends of the lower links 18.

A piston 19 reciprocates within a cylinder 21 carried by the tractor casing 11 and is connected by means of a connecting rod 22 to a crank arm 23 mounted upon the shaft 24. A pair of lift arms 26 are mounted upon the shaft 24 and are connected by lift rods 27 to the lower links 18.

Figure 3:
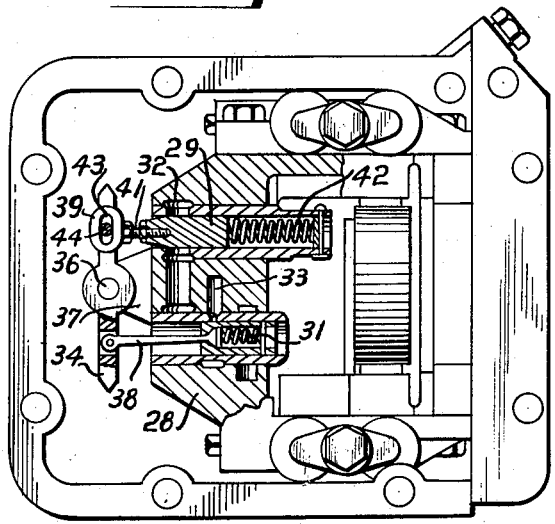
Figure 3 is a cross sectional view taken substantially on the plane indicated by the line 3—3 of Figure 2.

A fluid pump 28 of the double yoke type is also mounted upon the casing 11 and is continuously driven through suitable connections (not shown) by the tractor engine 12. As best shown in Figure 3, intake and exhaust valves 29 and 31 respectively are slidably mounted in the housing of the pump 28. The intake valve 29 controls a conduit 32 leading from the sump to the suction side of the pump while the exhaust valve 31 controls an exhaust conduit 33 adapted to connect the pump and cylinder to exhaust. Control of the separate intake and exhaust valves is effected through a rock arm 34 centrally pivoted at 36 upon a flange 37 extending outwardly from the pump housing. One end of the rock arm 34 is connected by means of a rod 38 to the exhaust valve 31, while the opposite end of the arm is formed with an enlargement 39 providing a bearing for engagement by an adjustable stud 41 mounted in the end of the intake valve 29. A coil spring 42 maintains the stud 41 carried by the intake valve 29 in engagement with the enlargement 39 of the rock arm, and constantly tends to rotate the arm in a counterclockwise direction. An elongated slot 43 is formed in the enlargement 39 of the rock arm and receives the lower end of an actuating lever 44.

The upper end of the actuating lever 44 is pivotally connected to an eccentric portion 45 of a shaft 46 journaled in the tractor casing. The shaft 46 is rotated by a hand lever 47 to effect a fore and aft movement of the upper end of the actuating lever 44. The upper end of the hand lever 44 moves in a quadrant 48 and the adjustable stop 49 can be set to give the desired maximum depth of cut. Movement of the hand lever 47 in the direction of the arrow 50, Figure 4, rotates the actuating lever 44 in a clockwise direction around the fulcrum 51 (described more in detail hereinafter), and the lower end of the actuating lever 44 swings the rock arm 34 in a counterclockwise direction as seen in Figure 3 to close the intake valve 29 and open the exhaust valve 31, permitting the implement to drop under its own weight.

Figure 4:
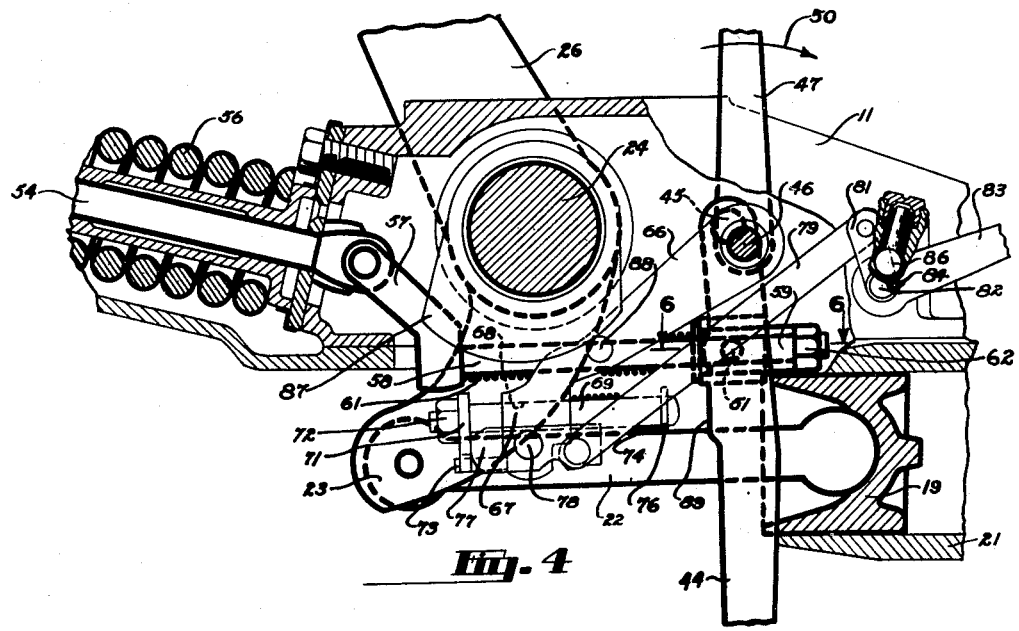
Figure 4 is a semi-diagrammatical side elevational view, partly in section, similar to a portion of Figure 2 but illustrating the height control mechanism in its "off" position. In this view, the various parts operative in connection with the draft control mechanism are shown in heavy lines with the other parts in relatively light lines.
Figure 6:
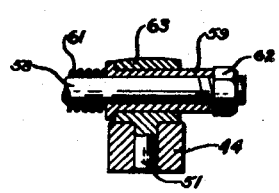
Figure 6 is a fragmentary cross sectional view taken substantially on the plane indicated by the line 6—6 of Figure 4.

The upper link 17, which in operation is under compression due to the draft on the plow, is connected at its forward end to a bellcrank lever 52 pivoted at 53 to the tractor casing and also to a rod 54 on which is mounted a heavy compression spring 56. The forward end of the rod 54 is pivotally connected to a link 57 which supports a forwardly extending rod 58. As best seen in Figures 4 and 6, a bushing 59 is slideably mounted upon the rod 58 and urged by a spring 61 toward a stop nut 62. A swivel member 63 is rotatably mounted upon the bushing 59 and the fulcrum pin 51 projects therefrom and pivotally engages an intermediate portion of the actuating lever 44.

When the plow is lowered to the ground by the movement of the hand lever 47 in the direction of the arrow 50, as described above, the draft then imposed upon the plow is effective through the upper compression link 17 to compress the coil spring 56 and to cause the rod 54, link 57, and rod 58 to move to the right. Since the coil spring 61 on the rod 58 is stronger than the return spring 42 associated with the intake valve 29, the fulcrum 51 of the actuating lever is moved to the right, swinging the actuating lever 44 about the shaft 46 and rotating the rock arm 34 in a clockwise direction to move the exhaust valve 31 toward its closed position. When the implement reaches the desired depth, the exhaust valve is closed.

It will be noted that when the hand lever 47 is raised the spring 61 may be compressed and the lever 44 moved rearwardly, thus permitting instantaneous adjustment of the hand lever even though the draft of the implement does not permit the draft control link 57 and rod 58 to be immediately shifted. Thus, at the end of a furrow the plow may be lifted without bringing the tractor to a complete stop to relieve the draft.

The draft control mechanism described above is effective to automatically maintain a constant draft upon the plow and thus controls the working depth thereof. When, however, it is desired to plow at a shallow depth such that the draft is insufficient to compress the spring 56, or when it is desired to use the tractor with other implements including those connected to the tractor by means of a conventional drawbar (not shown) carried by the lower link 18 (Figure 2), it is impossible with the draft control mechanism alone to hold the links or the drawbar at an intermediate position. Only two positions are possible, namely, the uppermost position and the lowermost position. As previously mentioned, it is highly desirable with certain implements and under certain conditions to be able to set and hold the drawbar and the implement attached thereto at selected intermediate heights. This can be accomplished by the height control mechanism now to be described.

A rearwardly extending arm 66 is pivotally mounted upon the shaft 46 concentrically with the hand lever 47. The arm 66 is formed with an enlarged downwardly extending flange 67 which is provided with a bore 68 therethrough slideably supporting a plunger 69. A plate 71 is secured to the rearward end of the plunger 69 by means of a nut 72. The plate 71 and the plunger 69 are prevented from turning during their reciprocation relative to the arm 66 by means of a pin 73 extending rearwardly from the lower portion of the flange 67 of the arm and slideably engaging a notch formed in the plate 71. A spring 74 encircles the plunger between the flange 67 and an enlargement 76 integrally formed at the end of the plunger, and constantly tends to urge the plunger in a forward direction.

A U-shaped cam member 77 straddles the flange 67 of the arm 66 and is pivotally connected thereto by the pin 78. The cam 77 is connected by means of a link 79 to one arm 81 of a bellcrank, the other arm 82 of which is journaled in the tractor casing. A manual control lever 83 is pinned to the arm 82 of the bellcrank and is effective upon operation to swing the cam 77 between the positions shown in Figures 4 and 5. Detents 84 are formed in the arm 82 of the bellcrank and are engaged by a spring urged ball 86 to hold the lever in its indexed positions.

Pivotal movement of the arm 66 and the plunger 69 carried thereby is controlled by means of a cam 87 mounted upon the shaft 24, the latter being the shaft carrying the lift arms 26. A cam roller or follower 88 is mounted upon the arm 66 and is arranged to be engaged by the cam 87.

The operation of the height control mechanism is as follows. When the draft control mechanism is operative, as in normal plowing operations, the height control mechanism is rendered inoperative by swinging the manual control lever 83 forwardly and downwardly to the position shown in Figure 4. It will be noted that this movement of the lever 83 is effective, through the bellcrank 82—81 and the link 79 to rotate the cam 77 in a counterclockwise direction. The end of the cam bears against the plate 71 carried by the plunger 69 and the latter is consequently moved to the left in the arm 66 against the action of the coil spring 74. This withdraws the end 76 of the plunger from its normal position adjacent the bearing surface 89 of the actuating lever 44. With the parts in this position, the draft control mechanism and the parts operative therewith, as indicated in heavy lines in Figure 4, are free to operate independently of the height control mechanism.

Figure 5:
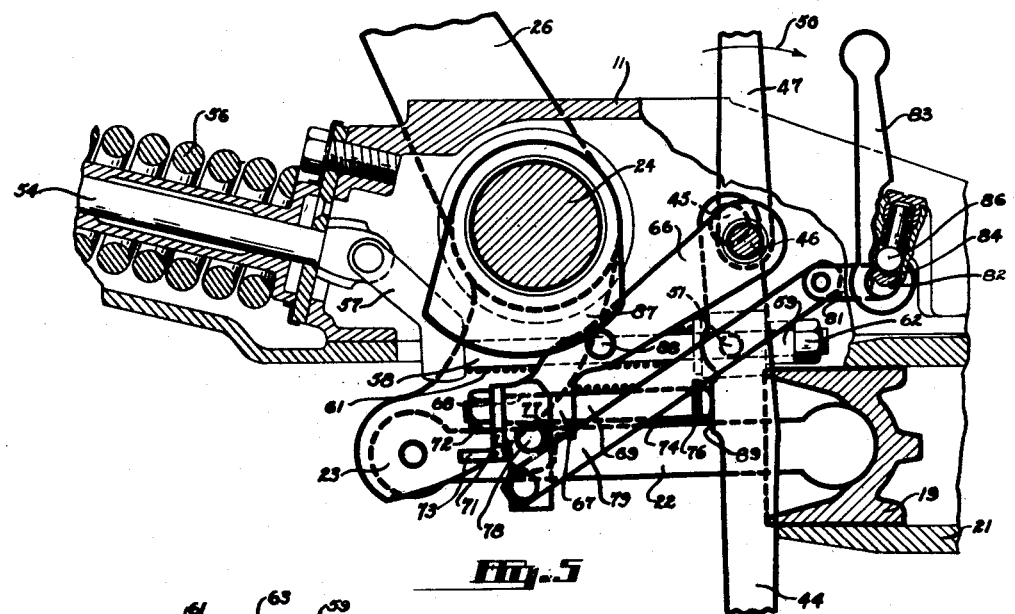
Figure 5 is a semi-diagrammatical view similar to Figure 4 but illustrating the height control mechanism in its operative position, and showing the various parts which are operative in connection with the height control mechanism in heavy lines, the other parts being shown in relatively light lines.

When it is desired to use the height control mechanism the manual control lever 83 is swung upwardly to the position shown in Figure 5. It will be noted that in this view the various parts associated with the height control mechanism and operative therewith are shown in heavy lines, while the other parts are shown in relatively light lines. The cam 77 is now moved to its upright position, permitting the plunger 69 to be moved under the action of the spring 74 to a position such that the plate 71 carried by the plunger abuts the rearward edge of the flange 67 of the arm 66. In this position the forward end 76 of the plunger is adjacent the bearing surface 89 formed on the actuating lever 44 and serves as a fulcrum for the lever.

Assuming now that it is desired to move the lift arms 26 and the lower links 18 connected thereto from the uppermost position shown in Figure 5 to a lower and intermediate position, the hand lever 47 is moved in the direction of the arrow 50, the amount of movement being dependent upon the desired position of the lower links and the drawbar. This shifts the upper end of the actuating lever 44 forwardly and, with the end 76 of plunger 69 forming a fulcrum, the actuating lever 44 swings in a clockwise direction to open the exhaust valve 31 and to permit the lower links 18 and the drawbar 65 to drop under their own weight. As the drawbar is lowered the lift arms 26 and the shaft 24 rotate in a counterclockwise direction and the cam 87 engages the cam follower 88 upon the arm 66 to rotate the latter in a counterclockwise direction about its pivotal connection with the shaft 46. Inasmuch as the plunger 69 is carried by the arm 66, the plunger is moved to the right and swings the actuating lever 44 in a counterclockwise direction about its upper pivotal connection with the eccentric 45. This return movement of the lever 44 operates the rock arm 34 to close the exhaust valve 31 and arrest the lowering movement of the links and drawbar after they have reached a predetermined height.

It will be noted that there is a definite relationship between the position of the hand lever 47 and the height at which the lower links 18 and the drawbar 45 are positioned. For a given movement of the hand lever 47 a definite movement of the cam 87 carried by the lift arm shaft is necessary to shift the actuating lever 44 and return the intake and exhaust valves to their neutral positions. During operation the drawbar is automatically maintained at the predetermined height. Tny leakage in the hydraulic system which causes the links 18 and the drawbar to be dropped below their predetermined height is effective through the cam 87 and the cam follower 88 to rotate the arm 66 and plunger 69 in a counterclockwise direction, shifting the actuating lever 44 and opening the intake valve 29 long enough to return the links and drawbar to their previous height. At any time the height of the drawbar can be adjusted in either direction simply by shifting the position of the hand lever 47.

Even though the height control mechanism is in its operative position and the end 76 of the plunger 69 is in engagement with the bearing surface 89 on the actuating lever 44, the hand lever 47 can be instantaneously moved upwardly, this being permitted by the yieldable spring 74 on the plunger 69. Subsequent movement of the lift arm shaft 24 and the cam 87 returns the parts to their normal positions. The spring 74 is, of course, made stronger than the intake valve spring 42 so as to overrule the latter.

Under certain circumstances the height control mechanism may be overruled by operation of the draft control mechanism. For example, with a spring tooth harrow the draft will normally be insufficient to operate the draft control mechanism and the height of the harrow will be determined by the height control mechanism, as hereinbefore described. If an obstacle is encountered, however, such as a rock or a root, the increase in draft will compress the draft control spring 56 and move the link 57 and rod 58 forwardly to swing the actuating lever 44 and open the intake valve 29. As a result the harrow is lifted from the ground and damage thereto is prevented. Similarly, in shallow draft plowing the draft control mechanism may take over operation of the hydraulic lift mechanism from the height control mechanism when an obstacle is encountered. Thus, the draft control mechanism and the height control mechanism cooperate in making possible the efficient operation of implements under all conditions.

With the height control mechanism described above, the attachment links and the drawbar carried thereby can be set and maintained at any desired height between the lowermost and uppermost positions, and a construction is provided which has definite advantages when used in shallow draft plowing, with harrows and the like, and also when used with various implements normally connected to a drawbar.

The drawings and specification of this application disclose the tractor mechanism embodied in tractors now being commercially manufactured by the assignee. Part of this structure forms the invention of the copending application of E. C. McRae, Serial No. 746,331, filed concurrently herewith, and part forms the invention of this application.

The invention of the said McRae application resides in the combination of height responsive mechanism, draft responsive mechanism and power actuated lifting mechanism for controlling the height of an implement carried by the tractor. Specifically, the height responsive mechanism includes parts 66, 67, 69, 71, 72, 74, 87 and 88 while the draft responsive mechanism includes parts 51, 54, 56, 57, 58, 59, 61, 62 and 63. The power actuated lifting mechanism includes parts 19, 21, 22, 23, 24, 26, 29, 31, 44 and 47. The combination of the above mechanisms forms the invention of the said copending McRae application.

The mechanism for selectively retracting the height responsive fulcrum from its engagement with the valve actuating lever to permit the tractor to operate in draft control alone, and the combination of this mechanism with the above mechanisms of the McRae invention, forms the subject matter of this application. Specifically, the selectively operated mechanism of this application includes the U-shaped cam member 77 and its pivot pin 78, link 79, bellcrank 81—82, manual control arm 83, detents 84, detent ball 86, and guide pin 71.

It will be understood that the invention is not to be limited to the exact construction shown and described, but that various changes and modifications may be made without departing from the spirit and scope of the invention, as defined in the appended claims.

What is claimed is:

1. In a tractor having means for the attachment of an agricultural implement, a hydraulic power unit, valve means for controlling the operation of said hydraulic power unit to raise and lower said attachment means with reference to the tractor, an actuating lever for moving said valve means between different operating positions, a manual control for said lever, draft responsive control means engageable with said lever, height responsive control means engageable with said lever, said draft responsive control means being adapted to operate either in conjunction with said height responsive control means or independently thereof, an arm arranged to move said height responsive control means to withdraw the latter from engagement with said lever and permit said draft responsive control means to operate alone, and manually operable means for actuating said arm.

2. In a tractor, a movable member adapted to be attached to an implement, a shaft rotatably supported upon said tractor, linkage connecting said member to said shaft to raise and lower the member upon rotation of the shaft, a hydraulic power unit for rotating said shaft, valve means for controlling the operation of said hydraulic power unit, a lever for actuating said valve means, manual control means for shifting the position of said lever, a pivotally mounted arm, a cam rotatable with said shaft and engageable with said arm to vary the position thereof as said shaft is rotated, a rod slideably mounted in said arm, spring means normally urging said rod to a position wherein the end of said rod forms a fulcrum for said lever to shift the position of the lever upon rotation of said shaft, cam means arranged to move said rod relative to said arm to withdraw the rod from engagement with said lever, and manually operable means for actuating said cam.

3. In a tractor, a movable member adapted to be attached to an implement, a shaft rotatably supported upon said tractor, linkage connecting said member to said shaft to raise and lower the member upon rotation of the shaft, a hydraulic power unit for rotating said shaft, valve means for controlling the operation of said hydraulic power unit, a lever for actuating said valve means, manual control means for shifting the position of said lever, a pivotally mounted arm, a cam rotatable with said shaft and engageable with said arm to vary the position thereof as said shaft is rotated, a rod slideably mounted in said arm, a plate carried by said rod adjacent one end thereof, spring means normally urging said rod in one direction relative to said arm to a position wherein said plate engages a portion of said arm and the opposite end of said rod forms a fulcrum for said lever, a cam pivotally mounted upon said arm and adapted to engage said plate, an operating handle mounted upon said tractor, linkage connecting said operating handle to said cam and arranged so that operation of said handle moves said cam into engagement with said plate and retracts said rod relative to said arm to withdraw the opposite end of said rod away from operative engagement with said lever.

4. In a tractor having means for the attachment of an agricultural implement, a hydraulic power unit, valve means for controlling the operation of said hydraulic power unit to raise and lower said attachment means with reference to the tractor, an actuating lever for moving said valve means between different operating positions, a manual control for said lever, a pivotally mounted arm, a spring urged plunger slideably mounted in said arm at a point spaced from the pivotal axis thereof, the free end of said plunger forming a fulcrum for said lever, means responsive to the raising and lowering of said attachment means to swing said arm about its axis and move the fulcrum of said lever to operate said valve means, a U-shaped elongated cam straddling said arm and pivotally connected intermediate its ends to said arm, cam surfaces formed upon each leg of said U-shaped cam at one side of the cam axis adapted to engage said rod to shift the latter, an operating handle pivotally mounted upon said tractor and rotatable between two detent positions, a crank arm operated by said handle, a link having one end connected to said crank arm and the other end connected to said cam to rotate the latter, the detent positions of said handle being arranged so that in one position said rod forms a fulcrum for said lever while in the other position the rod is withdrawn by said cam permitting operation of said lever independently of said fulcrum.

5. The structure defined by claim 3 which is further characterized in that said plate is clamped to said rod by a nut, and said plate and said arm have cooperating guide means therebetween for preventing rotation of said rod relative to said arm during sliding movement of said plunger.

DALE ROEDER.

REFERENCES CITED

The following references are of record in the file of this patent:

UNITED STATES PATENTS

| Number | Name | Date |
|---|---|---|
| 534,403 | Mechwart | Feb. 19, 1895 |
| 1,093,151 | Seck | Apr. 14, 1914 |
| 2,293,906 | Kvavle et al. | Aug. 25, 1942 |
| 2,356,231 | Ferguson | Aug. 22, 1944 |
| 2,405,980 | Sands et al. | Aug. 20, 1946 |
| 2,437,875 | Chambers et al. | Mar. 16, 1948 |

FOREIGN PATENTS

| Number | Country | Date |
|---|---|---|
| 541,436 | Great Britain | Nov. 26, 1941 |